United States Patent [19]
Gorham, Jr. et al.

[11] 3,882,255

[45] May 6, 1975

[54] METHOD FOR PREPARING FLAVORED POPCORN

[75] Inventors: Robert D. Gorham, Jr., Rocky Mount, N.C.; Lawrence D. Lorah, Concord; F. Gordon Willis, Jr., Winchester, all of Mass.

[73] Assignee: Robert D. Gorham, Jr., Rocky Mount, N.C.

[22] Filed: May 3, 1973

[21] Appl. No.: 356,969

[52] U.S. Cl. ............... 426/235; 426/237; 426/302; 426/305; 426/93; 426/392; 426/289; 426/293
[51] Int. Cl. .............................................. A23l 1/10
[58] Field of Search ............ 426/289, 294, 302, 89, 426/93, 96, 103, 351, 99, 98, 113, 237, 235, 293

[56] References Cited
UNITED STATES PATENTS

| | | | |
|---|---|---|---|
| 1,104,990 | 7/1914 | Harding | 426/450 |
| 2,222,560 | 11/1940 | Cleckner | 426/99 |
| 2,480,679 | 8/1949 | Spencer | 426/351 X |
| 2,893,332 | 7/1959 | Roser et al. | 426/294 |
| 2,958,602 | 11/1960 | Gilmore | 426/307 X |
| 3,457,080 | 7/1969 | Watkins | 426/239 |
| 3,617,309 | 11/1971 | Rebane | 426/93 |

*Primary Examiner*—Raymond N. Jones
*Attorney, Agent, or Firm*—Weingarten, Maxham & Schurgin

[57] ABSTRACT

A method for preparing popcorn containing no cooking oil residue and flavored with one or more selected flavorings. A dry cooking technique is employed for popping and cooking the corn kernels, and flavoring substances are applied to the cooked popcorn as it is dispensed and in a manner to prevent contamination of the popcorn by undesired flavors.

14 Claims, 7 Drawing Figures

3,882,255

METHOD FOR PREPARING FLAVORED POPCORN

FIELD OF THE INVENTION

This invention relates to food processing methods and more particularly to a method of preparing flavored popcorn.

BACKGROUND OF THE INVENTION

Popcorn is usually popped and cooked by means of an oil bath to which heat is applied and by which heat is conductively transferred to the corn kernels. The applied heat converts residual water within the kernel to steam, resulting in expansion and consequent popping of the kernels, and also cooks the endosperm, the starch containing portion of the kernels. The rate at which energy can be transferred to the kernels is limited by the conductivity of the husk and endosperm. Energy applied too quickly or energy applied non-uniformly to the kernel surface can result in burning of the husk. Although the oil serves to more evenly distribute heat applied to the kernel surfaces, significant disadvantages arise by use of such oil cooking. Cooking with oil, by its nature, requires that the apparatus employed continually be cleaned in order to prevent accumulation of stale residues which can contaminate the popcorn and diminish its marketability. In addition, oil imparts a flavor to the popcorn which may be incompatible with subsequent flavoring thereof. The residual oil remaining on the popped corn also limits the shelf life of the food product since the oil tends to soak into the popcorn resulting in a soggy product. Moreover, the presence of oil in the popcorn also increases its caloric content.

It is often desired to provide an intended flavoring to the popcorn. Such flavoring has generally been applied in the form of a particulate flavoring substance added to a quantity of popcorn. This type of flavoring technique often results in non-uniform flavoring of the popcorn by reason of non-uniform adherence to the popcorn and settling of the flavoring substance. If such flavoring is applied within the processing apparatus, a further problem arises in that residual flavoring substance remains in the apparatus, requiring thorough cleaning of the apparatus before another flavoring substance can be employed without spurious flavoring of the popcorn by previously employed flavoring substances. Similar problems arise in applying flavoring substances in liquid form, such as in the production of caramel coated popcorn.

SUMMARY OF THE INVENTION

In accordance with the invention, kernels of poppable corn are dry cooked without oil or other substance which could impart an unintended base flavor to the popped corn. One or more selected flavors are imparted to the popcorn by application of appropriate flavoring substances thereto while the popcorn is being dispensed. Flavoring is accomplished in a manner which avoids such contamination of the processing apparatus as can result in the imparting of residual flavors to the popcorn. Thus, a plurality of selected flavoring substances can be employed to flavor the popcorn as desired and without undesired residual flavoring. In typical embodiment, dry cooking of the corn kernels is accomplished by application of microwave energy and heat to provide popcorn having no oil or other contaminating residue. Flavoring is provided by apparatus which can include means for providing one or more selected flavorings at a common dispensing location. Uniform distribution and adherence of a flavoring substance to the popcorn surfaces can be provided, for example, by use of electrostatic coating techniques.

DESCRIPTION OF THE DRAWINGS

The invention will be more fully understood from the following detailed description, taken in conjunction with the accompanying drawings, wherein.

DETAILED DESCRIPTION OF THE INVENTION

In accordance with the present invention, a method for cooking and flavoring popcorn is disclosed whereby an improved selectively flavored popcorn product is provided.

Figure 1:
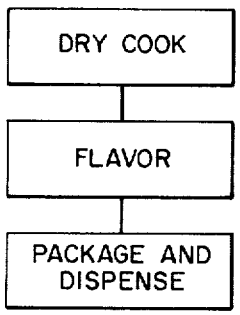
FIG. 1 is a block diagram showing a method for preparing popcorn according to the invention.

A basic method for preparation of popcorn according to the invention is set forth in FIG. 1. Popcorn kernels are supplied from a suitable source and are cooked and caused to pop in dry cooking apparatus in which no cooking oil or other substance is employed. The cooked popcorn is then flavored with one or more selected flavoring substances from a flavor source and packaged and dispensed by associated apparatus. Corn has a surface area to volume ratio which is higher than most foods and as a result loses heat by radiation much more quickly than other foods. Such radiational heat losses are minimized in a preferred dry cooking technique by application of both microwave energy and heat to the popcorn kernels. The microwave energy penetrates into the kernel and converts the residual water therein to steam. Heat is applied to the external surfaces of the kernels to provide an overall heated environment which speeds popping of the corn and cooking of the endosperm, which is the starch containing portion of the kernel.

Figure 2:
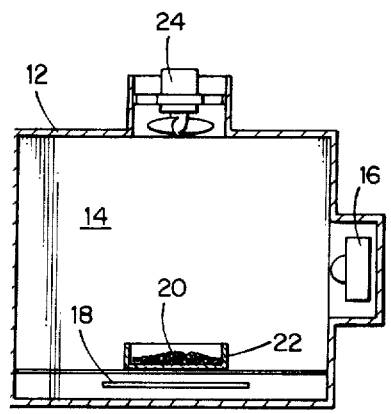
FIG. 2 is a schematic representation of apparatus for dry cooking kernels of popcorn useful in the practice of the method of the invention.

Typical dry cooking apparatus useful in practice of the invention is depicted in FIG. 2 and includes a housing 12 defining a cooking chamber 14. A microwave source 16, typically a magnetron, is disposed in communication with chamber 14, and a heat source 18 such as an infrared heating element, is disposed within the cooking chamber 14. A quantity of corn kernel 20 is contained within a receptacle 22 supported in cooking chamber 14 and in a position to be heated by microwave energy from source 16 and heat from source 18. An exhaust fan 24 is provided in communication with chamber 14 for the removal therefrom of steam produced during cooking. In operation, a quantity of corn kernels are popped and cooked in receptacle 22 and the popped corn within chamber 14 is removed by any suitable means, either manual or automatic, for subsequent flavoring and dispensing.

Figure 3:
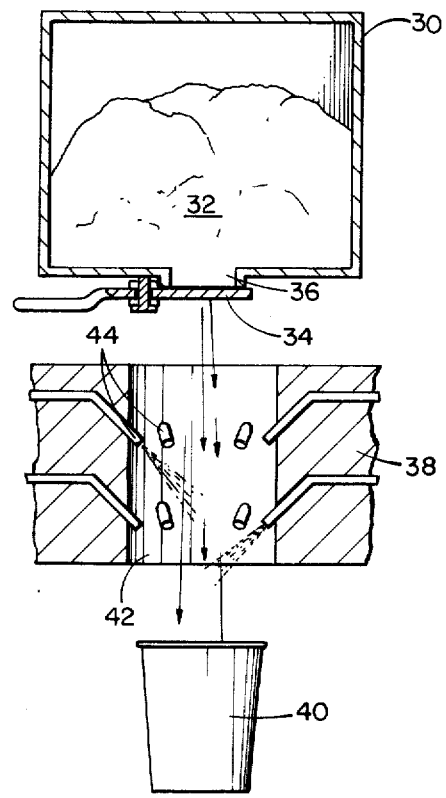
FIG. 3 is a schematic representation of apparatus for flavoring popcorn useful in the practice of the method of the invention.

Flavoring of the popcorn can be accomplished by many different means, a typical embodiment being illustrated in FIG. 3. A container 30 stores dry cooked unflavored popcorn 32 and includes a gate 34 arranged on the bottom wall of the container and operative in association with an exit opening 36 to permit flow of a quantity of popcorn from the exit opening through a flavoring head 38 into a dispensing container 40. The flavoring head 38 includes a passage 42 therethrough through which the popcorn passes and into which flavoring substances are supplied by respective supply tubes 44 supported by the head and having apertures communicating with passage 42. The apertures of supply tubes 44 are directed downwardly toward the dispensing container to minimize deposition of residual flavoring substances on the surface of passage 42 and into other apertures. As a result, the possibility of spurious flavoring of popcorn passing through passage 42 is minimized.

Each supply tube 44 can be coupled to a respective flavoring substance source to provide a selected flavoring to the popcorn passing through passage 42 into container 40. Alternatively, a single flavoring substance can be applied to the popcorn by a plurality of supply tubes to provide more uniform application of flavoring substance. The flavoring substance is typically of liquid or powder form and is usually applied as a fine spray onto the popcorn passing through the flavoring head. The passage 42 is preferably of larger cross-sectional area than that of exit opening 36 and is disposed in relation thereto such that popcorn traveling through the passage does not contact the wall surfaces or supply tubes of the flavoring head, thus further minimizing possible spurious flavoring.

Figure 4:
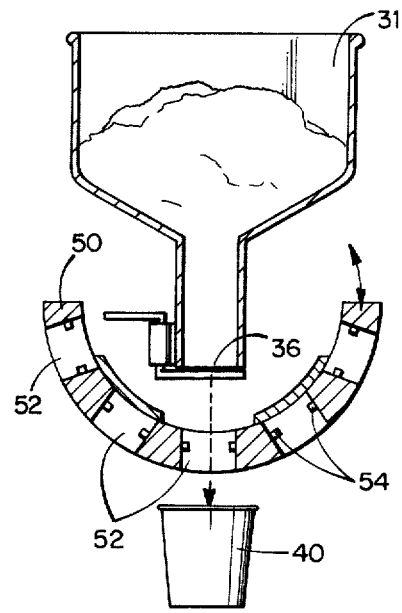
FIG. 4 is a schematic representation of alternative flavoring apparatus useful in the invention.

An alternative flavoring means useful in the invention is shown in FIG. 4 in which a flavoring head is employed having a plurality of passages which are selectively employed to provide respective flavoring to popcorn passing therethrough. Referring to FIG. 4, the flavoring head includes a housing 50 having a plurality of passages 52 therethrough, each of which can be selectively positioned in alignment with the exit opening 36 of an associated container 31 which is similar to that shown in the embodiment of FIG. 3. One or more supply tubes 54 is provided in communication with respective passages 52 to supply selected flavoring substances thereto. In operation, housing 50 is positioned to align a selected one of passages 52, corresponding to a selected flavor, with exit opening 36. A quantity of popcorn is caused to pass through the selected flavoring passages for intended flavoring as the popcorn travels into container 40.

Figure 5:
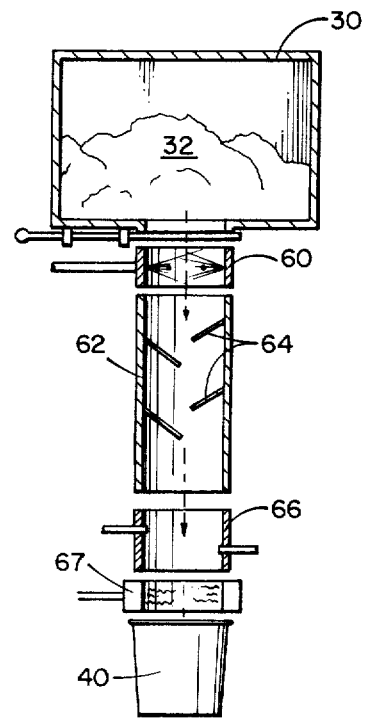
FIG. 5 is a schematic representation of electrostatic flavoring apparatus useful in the invention.

Apparatus employing electrostatic means for flavoring of cooked popcorn is shown in FIG. 5. A wetting unit 60 is usually provided for moistening the popcorn passing into an electrostatic charging unit 62 which can include baffles 64 charged at a first polarity and disposed for engagement with popcorn passing therethrough. The wetting of the popcorn enables the popcorn to more readily acquire an electrical charge in unit 62, and popcorn thus charged passes through a flavoring head 66 which may comprise apparatus similar to the apparatus of FIGS. 3 and 4. The flavoring head is operative to apply to popcorn passing therethrough selected flavoring substances, typically in particulate form, and having a charge of opposite polarity to that of the charged popcorn. Due to attraction between opposite charges, the flavoring substance distributed onto the surface of the popcorn is caused to intimately adhere thereto for uniform flavoring. The flavored popcorn is then dried in drying unit 67 before being dispensed.

Figure 6:
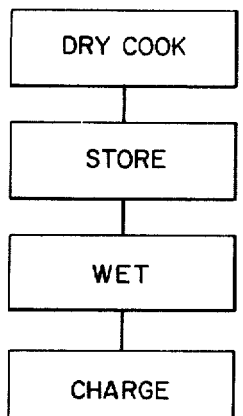
FIG. 6 is a block diagram showing an alternative method for preparing popcorn according to the invention.

A method according to the invention which includes electrostatic flavoring of the popcorn is depicted in FIG. 6. Kernels of poppable corn are dry cooked such as by combined microwave and infrared heating, and the popcorn thus produced is stored in a suitable container. The stored popcorn is then wetted, typically by a water spray, to increase the electrical charge carrying capacity of the popcorn for subsequent electrostatic charging and flavoring. Typically, a quantity of popcorn from the storage container and which is to be flavored and dispensed is wetted as the quantity of popcorn is conveyed to the electrostatic flavoring apparatus. The popcorn is then charged by passage through a charging means such as shown in FIG. 5, and one or more oppositely charged flavoring substances are applied to the charged popcorn to cause uniform distribution and adherence of the flavoring substances thereon. After flavoring of the popcorn it is dried to remove any excess moisture caused by the wetting step by suitable drying means such as an infrared or microwave energy source or a combined energy source similar to that illustrated in FIG. 2. The dried flavored popcorn is then packaged and dispensed.

It is a particular feature of the invention that substantially no contamination of the associated processing apparatus occurs during the cooking, flavoring or dispensing of the popcorn. Flavoring of the popcorn is accomplished in a manner and by means which prevent commingling of residual flavoring substances with those flavorings being presently applied to the dry cooked popcorn. During a particular flavoring step only the intended flavor or flavors is applied to the popcorn and the popcorn does not touch any apparatus surfaces which can contain other residual flavoring substances present from previous flavoring applications. The intended flavoring substance is usually applied to a quantity of popcorn along its travel path into a dispensing container such as a cup or carton. The flavored popcorn is thus stored within the container in which it is packaged and dispensed, rather than in a storage container which is part of the processing apparatus itself. In alternative embodiment, different flavored quantities of popcorn can be stored in respective containers in the processing apparatus to provide discrete supplies of differently flavored popcorn for later dispensing.

Figure 7:
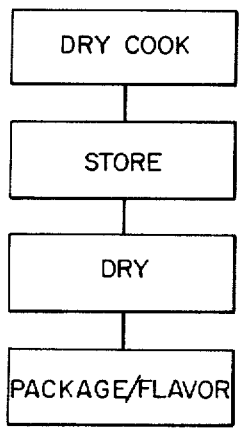
FIG. 7 is a block diagram showing a further alternative method for preparing popcorn according to the invention.

In an alternative embodiment of the invention illustrated in FIG. 7 a quantity of dry cooked popcorn is stored in a suitable container and is of sufficient bulk to provide a number of individual servings of flavored popcorn. The relatively large quantity of stored popcorn can absorb moisture from the atmosphere and become soggy and according to the invention the popcorn is dried prior to flavoring and packaging thereof. The drying step is typically accomplished on a quantity of popcorn which is to be flavored and dispensed. Alternatively the entire stored quantity of popcorn can be maintained in a dry state by employment of appropriate drying means. A quantity of suitably dried popcorn is then flavored and packaged as described hereinabove.

The invention can be embodied within a unitary apparatus operable either by an operator or by consumers. For example, the apparatus may be of the vending machine type located in theaters, shopping malls and similar sites to provide a compact station at which popcorn can be dispensed having a variety of selectable flavors to suit the desires of the purchaser. According to the invention the popcorn is freshly cooked and flavored such that a highly palatable and extremely fresh food product is provided. As discussed, a quantity of popcorn to be dispensed can be cooked and flavored on demand or alternatively a greater quantity of popcorn can be cooked and stored from which smaller quantities are flavored and dispensed on demand.

While the invention has been described in typical embodiment it will be appreciated that the novel method can be practiced by various means to suit specific requirements. Accordingly, it is not intended to limit the invention by what has been particularly shown and described except as indicated in the appended claims.

What is claimed is:

1. A method for preparing popcorn having at least one selected flavor and employing a cooking, flavoring and dispensing apparatus and including the steps of:
   dry cooking kernels of poppable corn in a cooking chamber to provide popped popcorn having no cooking oil residue thereon;
   dispensing said cooked popcorn from said cooking chamber into a flavoring chamber and causing said popcorn to traverse a travel path along which said popcorn is prevented from contacting any surface of said flavoring chamber;
   applying at least one selected flavoring substance to the cooked popcorn at a location within said flavoring chamber and along said travel path; and
   dispensing the flavored popcorn through a dispensing channel defined by said travel path whereby said cooked flavored popcorn does not contact the walls of said dispensing channel thereby preventing contamination of the dispensing channel by the flavoring substance.

2. A method for preparing popcorn according to claim 1 wherein the step of dry cooking includes applying microwave energy and heat to the corn kernels.

3. A method for preparing popcorn according to claim 1 wherein the step of dry cooking includes applying microwave energy and heat to the corn kernels and removing excess during cooking.

4. A method for preparing popcorn according to claim 1 and including the steps of:
   storing the popcorn after dry cooking; and
   removing prior to the dispensing of said popcorn excess moisture formed therein during cooking and storage.

5. A method for preparing popcorn according to claim 1 and wherein before said step of applying at least one selected flavoring substance there are included the steps of:
   applying an electrical charge of a first polarity to the popcorn; and
   applying an electrical charge of a second polarity to said at least one selectable flavoring substance; and wherein said applying step includes the step of causing said at least one charged flavoring substance to be distributed onto the surface of said popcorn for adherence thereto.

6. A method for preparing popcorn according to claim 5 and including the step of adding moisture to the popcorn before charging and flavoring thereof.

7. A method for preparing popcorn according to claim 6 and including the step of removing excess moisture from the flavored popcorn.

8. A method for preparing popcorn according to claim 1 and further comprising the step of packaging the flavored popcorn in a dispensing container concurrently with the dispensing thereof.

9. A method for preparing popcorn according to claim 8 wherein step of applying said at least one selected flavoring substance to the cooked popcorn occurs at a predetermined travel path lying substantially within said dispensing container.

10. A method for preparing popcorn having selectable flavors and employing a cooking, flavoring and dispensing apparatus and including the steps of:
    dry cooking kernels of poppable corn in a cooking chamber to provide popped popcorn having no cooking oil residue thereon;
    storing said cooked popcorn;
    storing a plurality of selectable flavoring substances;
    dispensing said cooked popcorn into a flavoring chamber and causing it to traverse a travel path along which said popcorn is prevented from contacting any surface of said flavoring chamber;
    applying at least one of said selectable flavoring substances to respective quantities of said popcorn at a location within said flavoring chamber and along said travel path; and
    dispensing the flavored popcorn through a dispensing channel defined by said travel path whereby the cooked flavored popcorn does not contact the walls of said dispensing channel thereby preventing contamination of said dispensing channel by the flavoring substance and preventing consequent contamination of the flavored popcorn by spurious flavoring substances.

11. A method for preparing popcorn according to claim 10 wherein the step of dry cooking includes applying microwave energy and heat to the corn kernels and removing excess moisture formed during cooking.

12. A method for preparing popcorn according to claim 10 and further including the step of removing excess moisture formed during cooking and storage of said popcorn.

13. A method for preparing popcorn according to claim 10 and further including the following steps:
    adding moisture to respective quantities of stored popcorn;
    applying an electrical charge of a first polarity to respective quantities of stored moistened popcorn; and
    applying an electrical charge of a second polarity to said at least one selectable flavoring substance;
    and wherein said step of applying said at least one flavoring substance includes the step of causing said at least one charged flavoring substance to be distributed onto the surfaces of said respective quantities of charged popcorn for adherence thereto.

14. A method for preparing popcorn according to claim 13 and further including the step of removing excess moisture from said respective quantities of flavored popcorn prior to the dispensing thereof.

* * * * *